(12) United States Patent
Barry et al.

(10) Patent No.: US 8,568,569 B2
(45) Date of Patent: Oct. 29, 2013

(54) METHOD AND APPARATUS FOR EFFICIENT PRODUCTION OF ACTIVATED CARBON

(75) Inventors: Louis T. Barry, Skillman, NJ (US); Christopher M. Doelling, Belle Mead, NJ (US)

(73) Assignee: Chavond-Barry Engineering, Blawenburg, NJ (US)

( * ) Notice: Subject to any disclaimer, the term of this patent is extended or adjusted under 35 U.S.C. 154(b) by 808 days.

(21) Appl. No.: 12/634,285

(22) Filed: Dec. 9, 2009

(65) Prior Publication Data

US 2011/0132738 A1  Jun. 9, 2011

(51) Int. Cl.
  *C10B 21/18* (2006.01)
(52) U.S. Cl.
  USPC ............. 201/29; 202/102; 202/104; 202/120; 202/121; 202/124; 422/150
(58) Field of Classification Search
  CPC .................................. C10B 53/06; C10G 1/02
  USPC .......... 202/102, 104, 120, 121, 124; 422/150; 110/185, 190, 204, 230, 148, 157; 432/36, 195; 201/28, 29
  See application file for complete search history.

(56) References Cited

U.S. PATENT DOCUMENTS

| | | | |
|---|---|---|---|
| 2,108,997 A | 2/1938 | Schilling | |
| 2,110,309 A | 3/1938 | Raisch | |
| 2,116,058 A | 5/1938 | Connolly | |
| 2,121,662 A | 6/1938 | Hartley et al. | |
| 2,114,566 A | 4/1939 | Lewers | |
| 2,655,883 A | 10/1953 | Martin | |
| 3,153,633 A | 10/1964 | von Dreusche, Jr. | |
| 3,379,622 A | 4/1968 | Von Dreusche, Jr. | |
| 3,905,757 A | 9/1975 | Von Dreusche, Jr. | |
| 3,958,920 A | 5/1976 | Anderson | |
| 3,968,756 A | 7/1976 | Yamada | |
| 3,994,829 A | 11/1976 | Alford | |
| 4,046,085 A | 9/1977 | Barry | |
| 4,050,390 A | 9/1977 | Hara et al. | |
| 4,092,935 A | 6/1978 | Barnabe | |
| 4,115,317 A | 9/1978 | Spater | |
| 4,215,637 A | 8/1980 | Lombana | |
| 4,215,981 A * | 8/1980 | von Dreusche, Jr. | 432/139 |
| 4,248,164 A | 2/1981 | Isheim | |
| 4,347,156 A * | 8/1982 | Lombana et al. | 502/55 |
| 4,374,092 A | 2/1983 | Marquess | |
| 4,453,474 A | 6/1984 | Lewis | |
| 4,455,282 A | 6/1984 | Marquess et al. | |
| 4,901,654 A | 2/1990 | Albertson et al. | |
| 5,080,025 A | 1/1992 | Nell et al. | |
| 5,316,471 A | 5/1994 | Nell | |
| 5,400,723 A | 3/1995 | Okuno et al. | |
| 5,957,064 A * | 9/1999 | Barry et al. | 110/188 |
| 6,061,384 A * | 5/2000 | Koslow | 373/109 |
| 6,962,117 B2 * | 11/2005 | Barry | 110/204 |
| 7,833,012 B2 * | 11/2010 | Beyer et al. | 432/129 |

* cited by examiner

*Primary Examiner* — Nina Bhat
(74) *Attorney, Agent, or Firm* — Kaplan Breyer Schwarz & Ottesen, LLP

(57) ABSTRACT

A system for regenerating or manufacturing activated carbon wherein exhaust gases and vapors for various lower sections of the furnace are recycled in up-flow fashion to higher sections of the furnace.

17 Claims, 6 Drawing Sheets

METHOD AND APPARATUS FOR EFFICIENT PRODUCTION OF ACTIVATED CARBON

FIELD OF THE INVENTION

This invention relates to the regeneration and manufacture of activated carbon in a multiple hearth furnace system.

BACKGROUND OF THE INVENTION

Activated carbon is a microcrystalline, nongraphitic form of carbon which has been processed to increase its porosity. Activated carbon is typically characterized by a large specific surface area. This large surface area enables activated carbons to act as a very effective absorbent as a result of the high degree of surface reactivity. Favorable pore size makes this surface area accessible to gases and liquids. Generally, the larger the surface area of the activated carbon, the greater is its adsorption capacity. Activated carbons are used in processes to efficiently remove pollutants from liquid and gaseous streams.

Different kinds of raw materials have been made into activated carbons, including plant material, peat, lignite, soft and hard coals, tars and pitches, asphalt, petroleum residues and carbon black. Coal has been found to be a good raw material for the production of activated carbons.

The preparation of activated carbons generally involves two steps. During the first step, noncarbon elements are eliminated as volatile gases by pyrolytic decomposition of the starting material. Where the feed stock contains water, the first step results in the production of steam. Once 'dry', a portion of the carbon feed stock is removed through devolatilization. As much of the volatile portions of the feed stock as possible is removed with the goal of only fixed carbon (FC) remaining along with an unavoidable residue of ash. The 'pores' of the remaining carbon, i.e. the FC, have been exposed by the devolatilization of the feed stock.

The second step involves a gasification reaction occurring at high temperature. During this step, the diameter of the pores is enlarged, thus increasing the volume of the pores. Typical reactions taking place in the furnace include the following:

$$C + H_2O \rightarrow CO + H_2$$

$$C + CO_2 \rightarrow 2CO$$

$$O_2 + H_2 \rightarrow 2H_2O$$

$$O_2 + 2CO \rightarrow 2CO_2$$

$$CO + H_2O \Leftrightarrow CO_2 + H_2$$

The $H_2O$ is introduced into the reaction in the form of steam, the C is primarily the FC resulting from the first step and the remaining reactants are free gaseous molecules.

Gasification converts the carbonized raw material into a form that contains the greatest possible number of randomly distributed pores of various shapes and sizes, and a final product with a high surface area.

Besides the activated carbon, outputs of the two steps described above include steam and volatile matter, both from the first step. It is known that steam may be brought from an area of a reaction where it is in excess to an area where it is required. U.S. Pat. No. 4,455,282 to Gerald Marquess and David J. Nell brought waste steam from a drying step into the oxidation step, where it was needed for the oxidation reactions.

SUMMARY OF THE INVENTION

A multiple hearth furnace is disclosed wherein a plurality of hearths are arranged in series. Some of the hearths form a drying section producing water vapor, some form a devolatilization section producing volatile gas and some define an activation section wherein chemical reactions take place that consume water vapor and $CO_2$ and are, as a net, endothermic. Recycled gas from the drying section and devolatilization section pass through an outlet attached to an activation section inlet by a conduit external to the furnace, whereby the water vapor fraction is consumed in the chemical reactions of the activation section.

The furnace may also include a combustion chamber, in-line with the conduit, whereby the volatile gas fraction of the recycled gas is burned in the combustion chamber. A water conduit may be attached to the combustion chamber, whereby supplemental water vapor may be added to the combustion chamber and heated therein. A portion of the volatile gas fraction may be burned in the activation section.

The multiple hearth furnace may be provided with a recycling fan to optimize the flow of recycled gas through the conduit. Similarly, an exhaust fan may be connected to the drying section by an exhaust outlet, whereby water vapor and volatile gas not able to be recycled can be removed from the furnace. A cyclone, or other particulate capture devise may be used to capture and return fines to the activation zone.

An alternative embodiment of the multiple hearth furnace through which a feed stock containing water, ash, FC and volatile material passes, the furnace of the alternative embodiment has a similar arrangement of hearths. A devolatilization section outlet is attached to a conduit external to the furnace with a volatile gas valve between the devolatilization section outlet and the conduit and an activation section outlet is also attached to the conduit with an activation section valve between the activation section outlet and the conduit. The other end of the conduit is connected to a drying section inlet, whereby a controlled portion of the gas inside the furnace flows from the drying section, through the devolatilization section and into the activation section with a portion of the activation section gas and devolatilization section gas recycled to the drying section.

The alternative embodiment furnace may also have a combustion chamber, in-line with the conduit, between the valves and the drying section inlet, whereby a portion of the combustible [the gas contains volatiles and CO, $H_2$, $CH_4$ etc] gas fraction of the recycled gas is burned in the combustion chamber. A recycling fan in-line with the conduit may also be provided to optimize the flow of recycled gas through the conduit. Similarly, an exhaust fan may be connected to one or more sections by exhaust outlets, whereby gas not needed for recycling is removed from the furnace.

The alternative embodiment furnace may be provided with one or more monitors, e.g. temperature or humidity monitors, supplying data from which it can be determined whether the furnace is performing at an optimal level. The flow through the activation section valve and the devolatilization section valve may then be varied independently to alter the flow therethrough and the flow through the exhaust fan may also be varied such that the optimal level may be achieved.

DETAILED DESCRIPTION OF THE INVENTION

Figure 1:
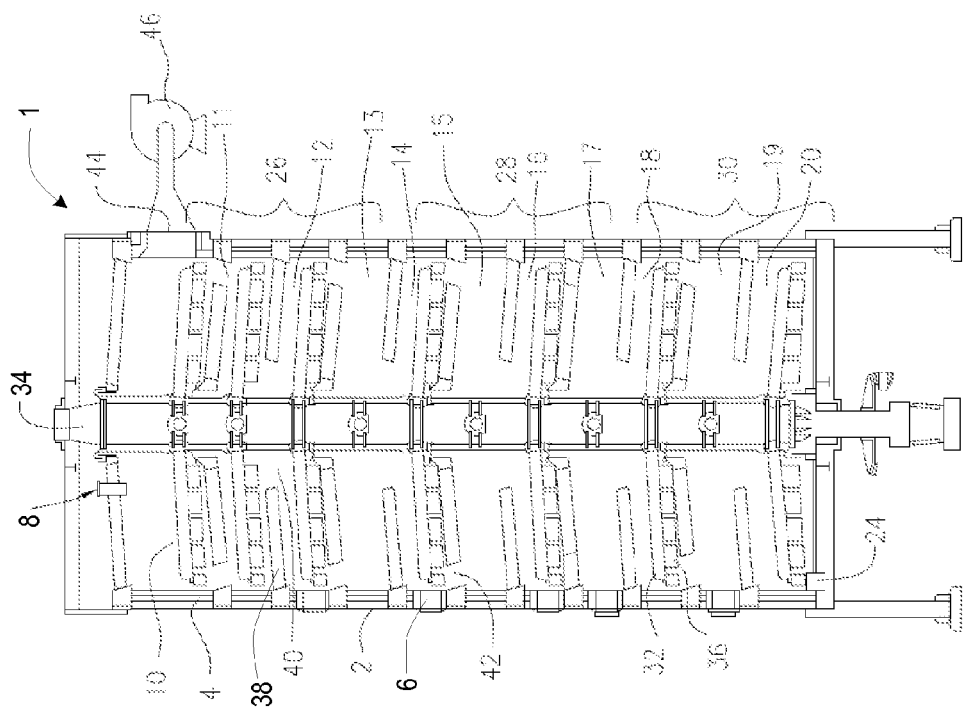
FIG. 1 is a cross-section of an elevation view of a prior art furnace.

Referring to the drawings, there is shown a multiple hearth furnace 1 of generally cylindrical configuration constructed of a tubular outer steel shell 2, which is lined with heat resistant, insulating material 4. This furnace is provided with a plurality of burner nozzles 6, with one or more being provided on one or more of the hearths, as necessary, for initial start-up operation and for controlling the temperatures within the different regions of the furnace to carry out the particular processing desired. Any suitable type of fuel may be provided to the burners 6.

The feed stock is fed in through an input port 8 and is thereby placed on top hearth 10. The remainder of the moving parts of multiple hearth furnace 1 serve to transport the feed stock through the hearths, transforming it into activated carbon, which exits the system through outlet port 24. The multiple hearths shown in FIG. 1 are divided into three different major sections. These sections, from top to bottom, are termed the drying section 26, the devolatilization section 28 and the activation section 30. In the present example, the drying section 26 comprises hearths 10 through 13. The devolatilization section comprises hearths 14 through 17, which vaporize the volatile portion of the feed stock, leaving inert ashes and fixed carbon ("FC"). The FC and ash then passes to the activation section 30, comprising hearths 18-20 and exits outlet port 24.

Figure 2:
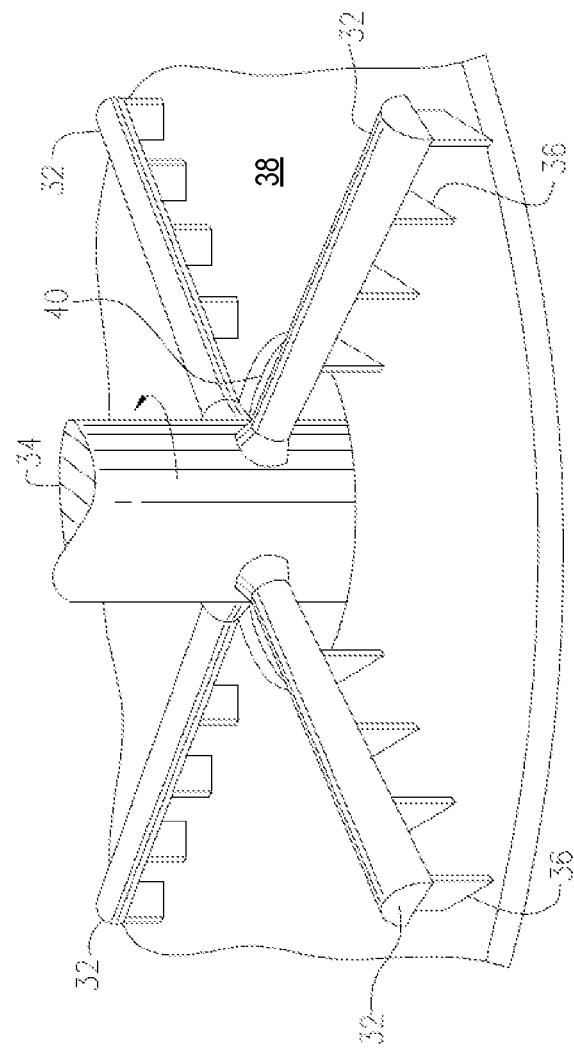
FIG. 2 is a perspective view of a detail showing the rotating shaft and connected arms with rabble teeth moving over a hearth plate, all contained in the furnace.

From feed stock to activated carbon, as well as the intermediate and waste materials, the solids are moved through furnace 1 through a combination of gravity and pushing. The pushing is accomplished utilizing arms 32 mounted on a rotating central shaft 34. Each arm 32 contains a plurality of rabble teeth 36. During operation, the central shaft 34 rotates and the arms 32 move around the hearth. The rabble teeth 36 are angled with respect to the rabble arms 32 so as to advance the solids, in the case of FIG. 2, toward the opening 40 at the center of the hearth bed 38 where it falls to the next hearth below. As can be seen in FIG. 1, the hearths alternate between central openings 40 and peripheral opening 42. Likewise the angle of the rabble teeth 36 alternate from one set of arms to the next such that they are always pushing the solids toward the hearth opening 40 or 42. To improve solid phase mixing and increase the time the solids reside on a hearth, one of the four rabble arms may be fitted with rabble teeth having the reverse angle (back rabble arm) causing the solids to be moved away from the hearth discharge by this one arm.

Thus, the feed stock to be processed enters the top of the furnace at an inlet 8 and passes downwardly through the furnace in a generally serpentine fashion alternately inwardly and outwardly across the hearths and is discharged at the bottom of the furnace, as indicated at 24.

Exhaust gases from the furnace are discharged from an outlet 44 at the top of the furnace 1. An exhaust fan 46 could be fitted to encourage the upward flow through the furnace 1. The upward flow of hot gas can be some portion, or all, of the heat needed to dry the feed stock in drying section 26. The exhaust gases discharged through outlet 44 are, thus, removing the water vapor from the drying section 26.

Once dried, the material is heated to about 1400° F. in the devolatilization section. All of the volatile material passes from the solids into the atmosphere inside the furnace 1. Only FC and ash remain. The FC moves into the activation section. In the activation section, the key chemical reactions are:

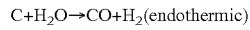
$C+H_2O \rightarrow CO+H_2$(endothermic)

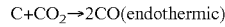
$C+CO_2 \rightarrow 2CO$(endothermic)

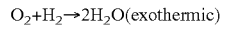
$O_2+H_2 \rightarrow 2H_2O$(exothermic)

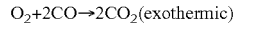
$O_2+2CO \rightarrow 2CO_2$(exothermic)

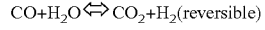
$CO+H_2O \Leftrightarrow CO_2+H_2$(reversible)

Note that there is no burning of the volatile material. This material is not present in the activation section 30 in the prior art, up flow design, it having flowed away from the activation section 30 and into the drying section 26 and out the exhaust outlet 44.

Figure 3:
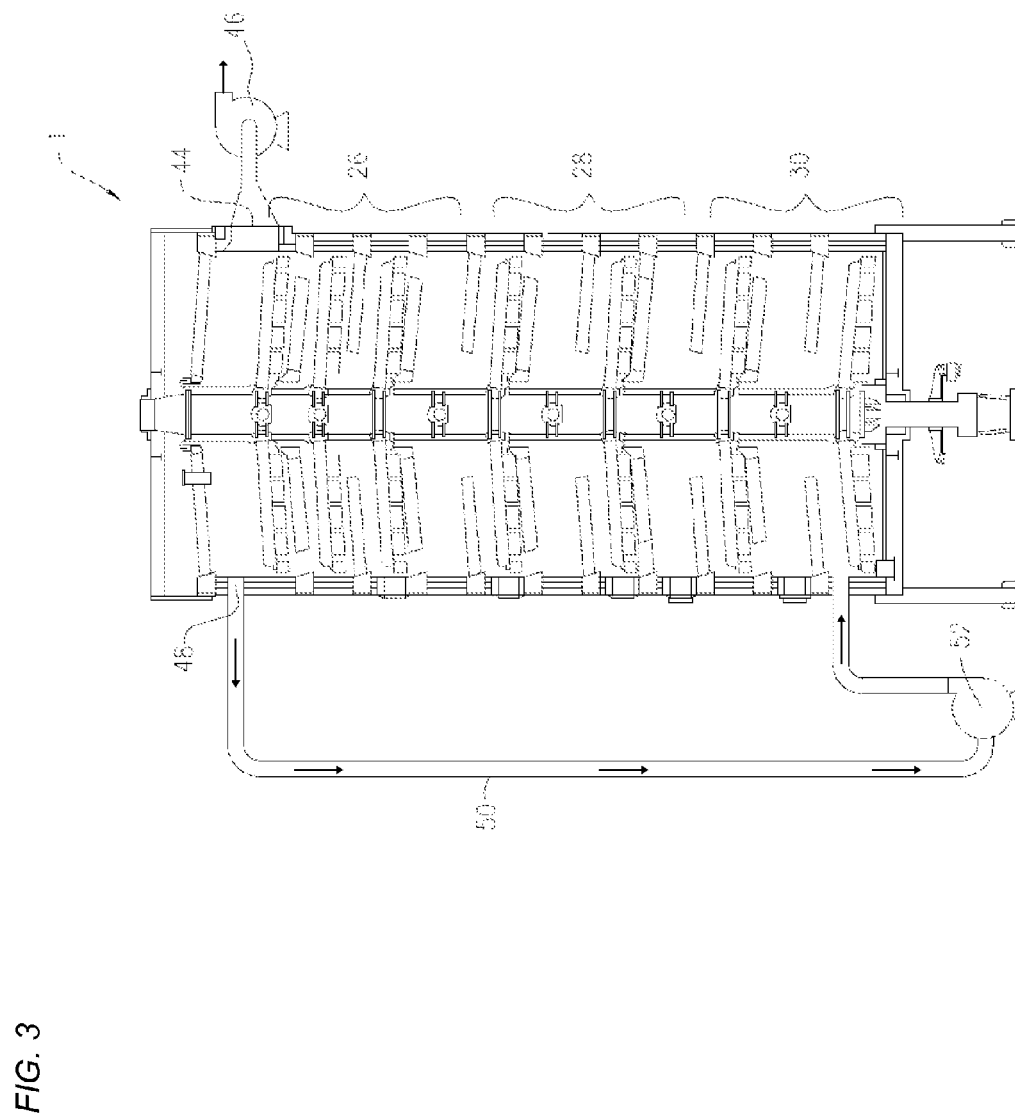
FIG. 3 is a cross-section of an elevation view of an up-flow embodiment of the furnace of the present invention.

FIG. 3 shows furnace 1 having a second exhaust outlet 48. Some portion or all of the exhaust from drying section 26, including a substantial portion of steam from the drying process, may exit outlet 48 and be conveyed by pipe 50 as a recycle stream into the activation section 30. The water fraction supplies some or all of the $H_2O$ for the above detailed chemical reactions necessary for activation of the FC.

In addition, the vaporized volatile matter in this recycle stream, having flowed from the devolatilization section 28 into the drying section 26, is fuel. The vaporized volatile matter fraction of the recycle stream is injected into the gas space above the FC material in the activation section 30 and all or a portion is burned as fuel. Thus, the exhaust gas from drying section 26 and devolatilization section 28 are recycled and used as a source of free steam and fuel to add energy for the endothermic reactions of activation. A significant portion of the fuel used to create steam to be injected into the activation section 30 will be saved by use of the recycled steam. In addition, a significant portion of the fuel used to support the endothermic reactions in the activation section 30 will be replaced by the recycled fuel. Recycling fan 52, or other means, may be used to regulate flow of the recycle stream into the activation section 30.

Figure 4:
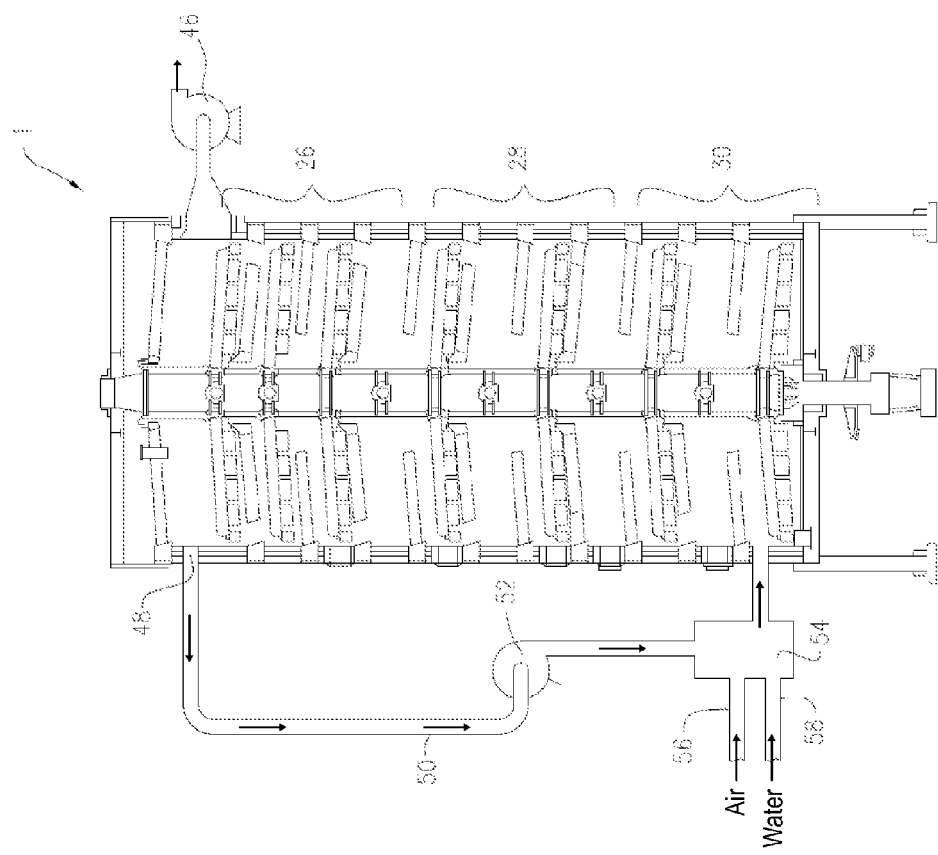
FIG. 4 is a cross-section of an elevation view of an alternative up-flow embodiment of the furnace of the present invention.

FIG. 4 shows a combustion chamber 54 outside of the shell 2 of the furnace 1. Inputs to the furnace may include the recycle stream from the drying section 26 and devolatilization section 28, as well as supplemental air from air line 56 and hot combustion products from burners 6. The air is supplied to combustion chamber 54 through air line 56 and water is supplied through pipe 58. These supplements may be necessary to optimize the desired levels in activation section 30, particularly of water. In the event that too much steam is entering activation section 30, a greater proportion of exhaust from the drying section 26 may be passed through outlet 44 instead of being recycled.

Besides optimizing the steam concentration, combustion chamber 54 may be used to optimize burning of the fuel fraction of the recycled gas stream. The fuel fraction of the recycled gas stream contains the volatiles as well as $H_2$ and CO from various chemical reactions within the furnace 1, particularly from the activation section 30.

Figure 5:
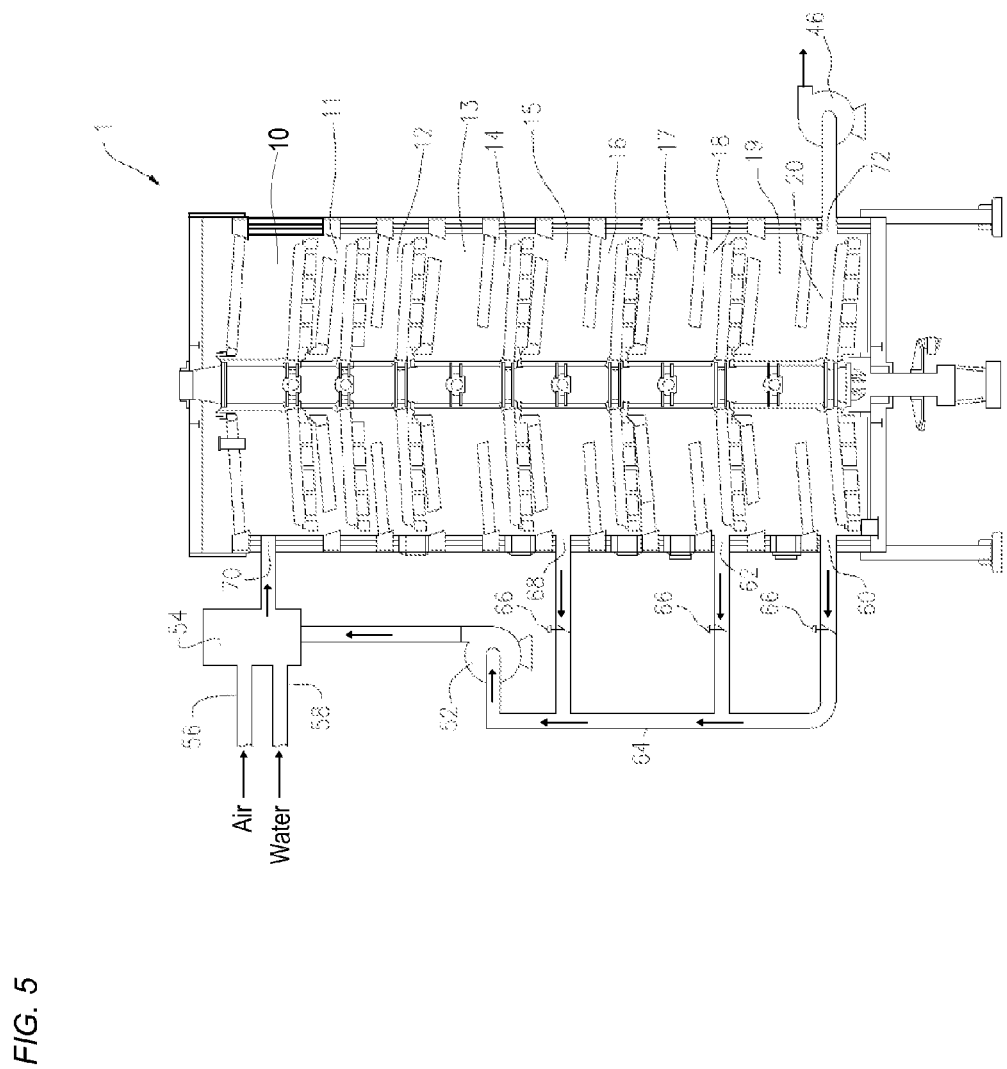
FIG. 5 is a cross-section of an elevation view of a down-flow embodiment of the furnace of the present invention.

FIG. 5 discloses an alternative embodiment of furnace 1 wherein the flow of gasses is down, i.e. a down flow furnace.

Note that the exhaust gas leaves the furnace at hearth 20, as opposed to hearth 10 in the up flow embodiments of FIGS. 1, 3 and 4, discussed above. One advantage of the down flow is most of the volatiles from the devolatilizing section 28, instead of heading toward the drying section 26, flow toward the activation section 30 and are either burned or converted to non-condensable gases such as N2, CO2, CO, H2 and CH4, for example. Furnace 1 of FIG. 5 takes the gases from hearths 18-20 through outlets 60, 62 and pipe 64, recycling that gas to top hearth 10. In addition, gas may be recycled from one of the devolatilization hearths 14-17 through outlet 68. Flows from outlets 60, 62 and 68 may be adjusted through valves 66 adjacent each outlet.

As in FIG. 3, recycle pipe 64 may be directly attached (not shown) to top hearth 10 inlet 70 with a recycle fan 52, as necessary, providing the energy needed for drying and devolatilization, with the available volatiles burning in the furnace 1 and adding their energy where needed. As in FIG. 4, a combustion chamber 54 may be provided outside of furnace 1. The gasses from activation section 30 and devolatilization section 28 are fed into combustion chamber 54 along with supplemental air from air line 56 and supplemental water from water pipe 58, as necessary. A portion of the volatiles and any other calorific gas from outlets 60, 62 and 64 are burned prior to being added to top hearth 10 through inlet 70. Gas not needed for recycling is drawn off at outlet 72 by exhaust gas fan 46. Excess combustible gas is allowed to flow down through the drying and devolatilizing zones. Injection air is used in the hearth's gas spaces in the drying and devolatilizing zones to burn a portion of such gas as a heat source.

Actuatable valves 66 and the power to exhaust fan 46 are controlled such that the composition of the recycled gas passing through recycled gas fan 52 is controlled for multiple variables. That is, the fuel content (primarily derived from outlet 68 of devolatilization section 28) and the steam content (primarily derived from outlets 60, 62 of activation section 30) of the recycled gas are monitored and controlled by adjusting the flow through outlets 60, 62 and 68 by valves 66 and the exhaust flow through outlet 72 by the power supplied to exhaust gas fan 46.

Figure 6:
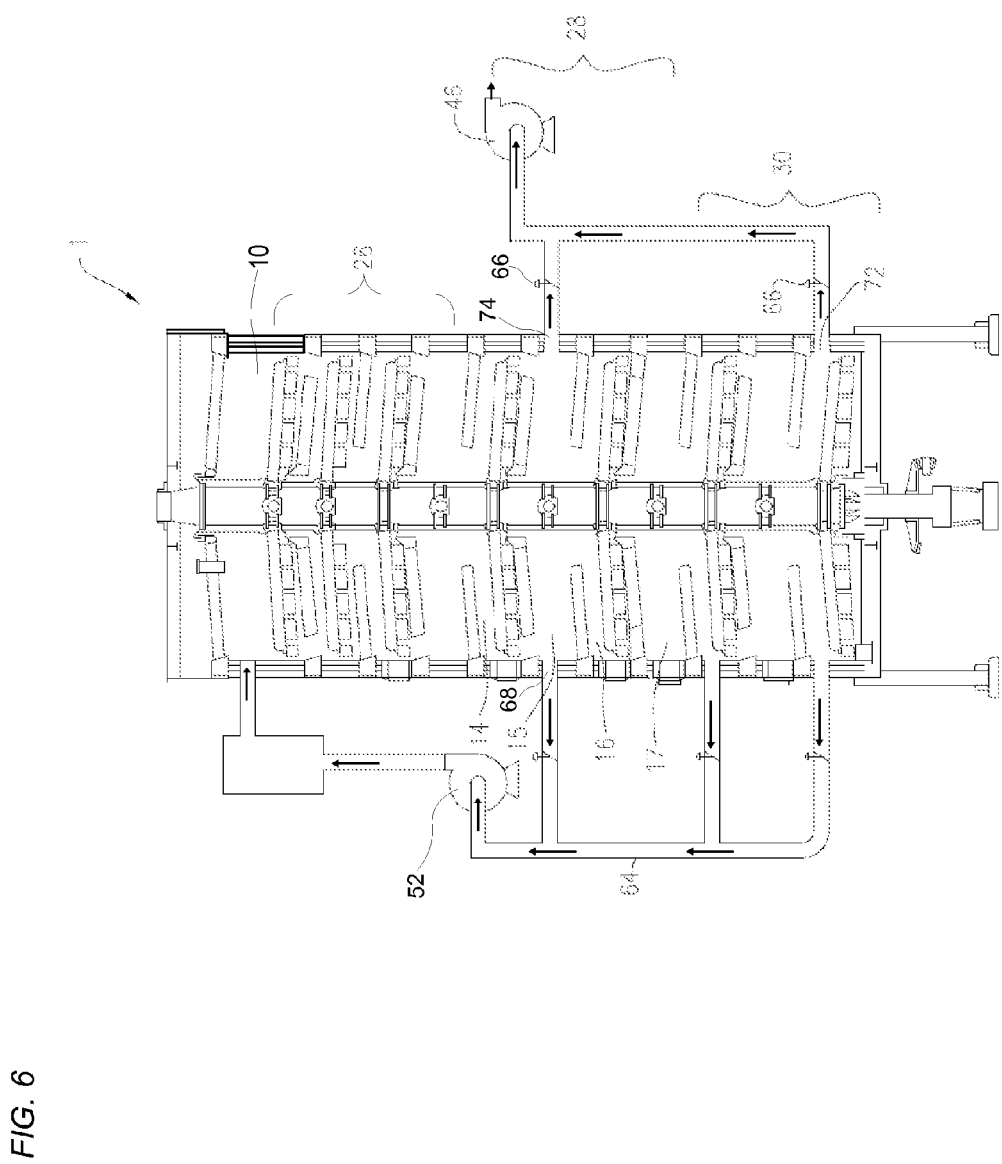
FIG. 6 is a cross-section of an elevation view of an alternative embodiment of a down-flow furnace of the present invention.

FIG. 6 discloses an alternative embodiment for situations where the feed stock may be excessively high in volatiles. In such a case there is the possibility that drawing too many volatiles through activation section 30, with or without the volatiles through outlet 68 and recycle pipe 64, may cause a decrease in activation rate. The excessive volatiles may be controlled with an outlet 74 in one of the devolatilization hearths 14-17 attached to outlet fan 46. Valves 66 may also be added in line with outlet 74, as well as in line with outlet 72, to meter the gases drawn from the devolatilizing section 28 and the activation section 30.

Standard temperature, humidity, sampling and/or otherwise appropriate monitors may be located at any convenient location of any of the embodiments described herein. Data from these monitors may be used to optimize the drying, devolatilization and activation processes occurring in furnace 1. Such optimization may take the form of adjusting valves 66 to vary gas flows to/from various sections of the furnace as well as adjusting the power supplied to either of fans 46 or 52, particularly where the inlets to fans 46, 52 are not provided with a valve.

It is also possible to use raw materials such as old tires that are suitable for the manufacture of activated carbon, but which arrive void of water. In this embodiment, the although water can still be inserted into the process to generate the required steam, the energy to heat such water can still be derived from the process as explained above.

It is also noted that in arrangement like that shown in FIG. 5, where gas from the devolatilization section and from the bottom hearth are mixed, some minor empirical experimentation may be needed to optimize the process. Specifically, increasing the flow from the devolitilization zone reduces the combustible material flowing to the activation zone. This reduces the heat available by burning this gas with injection air. It also reduces the chance the product will be contaminated by adsorbing impurities. Taking more from the bottom flue draws more water and more combustible material to the activation zone. The balance is to recycle enough to get high water and low combustible into the activation zone, which balance can be arrived at in any particular system by simply altering the amount taken from each zone.

It will thus be seen that the present invention does indeed provide an improved system for manufacturing or regeneration of activated carbon, which is superior in operability and efficiency as compared to prior art systems.

Although certain particular embodiments of the invention are herein disclosed for purposes of explanation, various modifications thereof, after study of this specification, will be apparent to those skilled in the art to which the invention pertains.

It is noted that, while the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

Those skilled in the art, having the benefit of the teachings of this specification, may achieve numerous modifications thereto and changes may be made without departing from the scope and spirit of the invention in its aspects.

What is claimed is:

1. A method for operating a multiple hearth furnace to produce activated carbon, wherein the furnace comprises a plurality of vertically arranged hearths within a shell, wherein:

hearths uppermost in the shell define a drying section;
   hearths lowermost in the shell define an activation section; and
   hearths between the drying and activation sections define a devolatilization section, and wherein the method comprises:
   creating a recycle by:
   (i) withdrawing a first portion of gas from the shell, wherein the first portion of gas is obtained from the activation section; and
   (ii) adding a recycle stream to the shell at or above the drying section, wherein the recycle stream comprises at least some of the first portion of gas.

2. The method of claim 1 and further comprising the operations of:
   adding air to the first portion of gas after the first portion of gas is withdrawn from the shell;
   combusting at least some combustible matter in the first portion of gas before adding the recycle stream to the shell activation section.

3. The method of claim 2 and further comprising the operation of enriching the recycle stream with steam by adding water to the first portion of gas and added air that is being combusted, the added water thereby forming steam, the steam thereby becoming a part of the recycle stream.

4. The method of claim 1 and further comprising the operation of withdrawing a second portion of gas from the shell, wherein the second portion of gas is obtained from the devolatilization section, and wherein the recycle stream further comprises at least some of the second portion of gas.

5. The method of claim 1 and further comprising the operations of:
adding air to the first portion of gas and the second portion of gas after withdrawing same from the shell; and
combusting at least some combustible matter in the first portion of gas and the second portion of gas before adding the recycle stream to the shell.

6. The method of claim 5 and further comprising the operation of enriching the recycle stream with steam by adding water to the first portion of gas, the second portion of gas, and the added air that is being combusted, the added water thereby forming steam, the steam thereby becoming a part of the recycle stream.

7. The method of claim 5 and further comprising the operation of withdrawing a third portion of gas from the shell, wherein the third portion of gas is obtained from the activation section and further wherein the third portion of gas is not returned to the shell.

8. The method of claim 7 and further comprising the operation of withdrawing a fourth portion of gas from the shell, wherein the fourth portion of gas is obtained from the devolatization section and further wherein the fourth portion of gases is not returned to the shell.

9. A multiple hearth furnace for producing activated carbon, comprising:
a. a plurality of hearths disposed within a shell, wherein the hearths are vertically arranged defining three sections, including:
(i) a drying section proximal to a top of the furnace;
(ii) a devolatization section below the drying section; and
(iii) an activation section below the devolatization section;
b. a recycle conduit disposed external to the shell to recycle a first portion of gases to the top of the furnace, wherein the recycle conduit has:
(i) at least two inlets that fluidically couple the recycle conduit to two hearths within the activation section; and
(ii) at least one outlet that fluidically couples the recycle conduit to the furnace at or above an uppermost hearth of the drying section.

10. The furnace of claim 9 wherein the first portion of gases comprises predominantly volatile matter.

11. The furnace of claim 9 further comprising a fan, wherein the fan is in-line with the recycle conduit and is configured to draw the first portion of gases into the recycle conduit and move the first portion of gases toward the top of the furnace.

12. The furnace of claim 9 further comprising a combustion chamber disposed external to the shell and in-line with the recycle conduit.

13. The furnace of claim 12 wherein the combustion chamber further comprises an outlet that delivers, to the top of the furnace, fluid comprising the first portion of gases.

14. The furnace of claim 9 and further wherein the recycle conduit receives, in addition to the first portion of gases, additional gases through a third inlet that fluidically couples the recycle conduit to the devolatization section.

15. The furnace of claim 9 wherein the shell comprises:
at least a first recycle gas outlet and a second recycle gas outlet through which the first portion of gases flow to the at least two inlets of the recycle conduit; and
a first exhaust gas outlet through which a second portion of gases flow, wherein the second portion of gases is not returned to the furnace.

16. The furnace of claim 15 wherein the first exhaust gas outlet is fludically coupled to the activation section.

17. The furnace of claim 16 further comprising a second exhaust gas outlet through which a third portion of gases flow, wherein the second exhaust gas outlet is fluidically coupled to the devolatization section, and further wherein the third portion of gases is not returned to the furnace.

* * * * *